United States Patent [19]
Pless

[11] Patent Number: 5,968,323
[45] Date of Patent: Oct. 19, 1999

[54] METHOD AND APPARATUS FOR GENERATING LARGE VELOCITY, HIGH PRESSURE, AND HIGH TEMPERATURE CONDITIONS

[76] Inventor: Irwin A. Pless, 4 Addington Rd., Brookline, Mass. 02146

[21] Appl. No.: 08/893,084

[22] Filed: Jul. 15, 1997

Related U.S. Application Data

[62] Division of application No. 08/378,786, Jan. 26, 1995, abandoned.

[51] Int. Cl.$^6$ .................... C07B 1/00; G21B 1/00
[52] U.S. Cl. .................. 204/157.62; 376/102; 376/149
[58] Field of Search .................... 204/157.62; 376/102, 376/149

[56] References Cited

U.S. PATENT DOCUMENTS

| | | | |
|---|---|---|---|
| 4,333,796 | 6/1982 | Flynn | 376/100 |
| 4,339,247 | 7/1982 | Faulkner et al. | 55/15 |
| 4,466,870 | 8/1984 | Boudjouk et al. | 204/158 |
| 5,164,094 | 11/1992 | Stuckart | 210/708 |
| 5,344,532 | 9/1994 | Joseph | 204/157.15 |
| 5,659,173 | 8/1997 | Putterman et al. | 250/361 |

OTHER PUBLICATIONS

Crum et al., "Sonoluminescence", 266 Science/Perspectives (233–234), Oct. 14, 1994.
M.D. Cable et al., "Indirectly Driven, High Convergence Inertial Confinement Fusion Implosions", 73 Phys. Rev. Lett. 2316 (Oct. 24, 1994).
L. J. Suter et al., "Modeling and Interpretation of Nova's Symmetry Scaling Data Base", 73 Phys. Rev. Lett. 2328 (Oct. 24, 1994).
T.R. Dittrich et al., "Diagnosis of Pusher–Fuel Mix in Indirectly Driven Nova Implosions", 73 Phys. Rev. Lett. 2324 (Oct. 24, 1994).
Kauffman et al., "High Temperatures in Inertial Confinement Fusion Radiation Cavities Heated with 0.35 $\mu$m Light", 73 Phys. Rev. Lett. 2320 (Oct. 24, 1994).
Barber et al., "Sensitivity of Sonoluminescence to Experimental Parameters", 72 Phys. Rev. Lett. 1380 (Feb. 28, 1994).
Hiller et al., "Effect of Noble Gas Doping in Single–Bubble Sonoluminescence", 266 Science/Reports 248 (Oct. 14, 1994).
C.C. Wu et al., "A Model of Sonoluminescence", 445 Proc. R. Soc. Lond. A 323–349 (1994) no month available.
Bradley Paul Barber, "Synchronous Picosecond Sonoluminescence", Ph.D. Dissertation, UCLA Physics Department (1–130) Jun. 1992.
Article entitled "The Color of Sound", Scientific American pp. 24+26 (Dec. 1993).
Hickling, "Transient High–Pressure Solidification Associated with Cavitation in Water", 1994 The American Physical Society, Physical Review Letters, vol. 73, No. 21, Nov. 21, 1994, pp. 2853–2856.
Thomas V. Prevenslik, Sonoluminescence, Cold Fusion, and Blue Water Lasers (3 pages), Jan. 1995.
Kenji Fukushima and Tadahiro Yamamoto, "The Upper Bound of Hot–Spot Temperatures Induced by Supersonic Field" (5 pages), Jan., 1995.
Barber, "Synchronous Picosecond Sonoluminescence", Ph.D. Dissertation, UCLA Physics Department, pp. 1–130, Jun. 1992.

*Primary Examiner*—Kathryn Gorgos
*Assistant Examiner*—Edna Wong
*Attorney, Agent, or Firm*—Fish & Richardson P.C.

[57] ABSTRACT

A method of concentrating energy to produce large velocity, high pressure and/or high temperature conditions, including the steps of forming a resonant cavity inside a container; filling the resonant cavity with a liquid having a compressibility that is smaller than that of water at room temperature; coupling energy into the resonant cavity at a frequency which drives the resonant cavity at or near a resonant mode thereby creating one or more velocity nodes in the resonant cavity; and capturing a quantity of material or mixture of material in the resonant cavity at one of the velocity nodes.

23 Claims, 2 Drawing Sheets

METHOD AND APPARATUS FOR GENERATING LARGE VELOCITY, HIGH PRESSURE, AND HIGH TEMPERATURE CONDITIONS

This is a divisional of copending application Ser. No. 08/378,786, filed Jan. 26, 1995 now abandoned.

BACKGROUND OF THE INVENTION

This invention generally relates to a technique which is used to produce cavitation and/or sonoluminescence in liquids.

It is well known that high velocity motion in a liquid can cause cavitation, or bubbles in the liquid. Many diverse mechanisms, e.g. propellers in water or ultrasonic sound waves, have been observed to cause such cavitation. Ultrasonic sound waves can produce not only cavitation but also a phenomenon known as sonoluminescence, which is the emission of light from the gas in cavitation bubbles.

In 1990, a paper was published by F. Gaitan and L. Crum, (see "Sonoluminescence from Single Bubbles" T. Acoust. Soc. AM. Suppl. 1, 87, 3141 (1990)) in which they reported that it is possible to capture a single small bubble of gas in the interior of a volume of water in which there existed a standing sound wave. This volume of water was excited at its fundamental vibrational mode. The bubble trapped in the center of the volume of liquid was shown to emit light. This phenomena goes by the name of "Single Bubble Sonoluminescence." Since that time, much experimental and theoretical work has been done on single bubble sonoluminescence, and there is now an extensive literature on the subject.

The following are representative of the papers that have been written and they contain extensive references to other earlier published work:

"Synchronous Picosecond Sonoluminescence," Ph.D, Dissertation of Bradley Paul Barber, UCLA Physics Department, Los Angeles, Calif. (1992)

"Sensitivity of Sonoluminescence to Experimental Parameters," B. P. Barber, C. C. Wu, R. Lofstedt, P. H. Roberts, and S. J. Putterman, Physical Review Letters, Volume 72, Number 9, Feb. 28, 1994, pages 1380–1383

"A Model of Sonoluminescence," C. C. Wu and P. H. Roberts, Proceedings of the Royal Society of London, A (1994) 445, pages 323–349

"Sonoluminescence," L. A. Crum and R. A. Roy, Science, Volume 266, Oct. 14, 1994, pages 233–234

"Effect of Noble Gas Doping in Single-Bubble Sonoluminescence," R. Hiller, K. Weninger, S. J. Putterman and B. P. Barber, Science, Volume 266, Oct. 14, 1994, pages 248–250

The above-referenced articles and the references cited therein all describe similar technologies. In general, the technology typically involves using a resonant container filled with water as the central component. Then, using a well known acoustical technique, a transducer is attached or glued to the surface of the container to drive the container at its resonant frequency. Various techniques are disclosed for injecting a gas bubble into the water including using a stirring rod, shooting a stream of air into the water using a hypodermic needle, and passing a current through a wire that is immersed in the water.

Researchers have tried to increase the temperatures and pressures that are obtainable with the trapped bubbles that exhibit sonoluminescence. The focus in some of these efforts has been on reducing the amount of dissolved gases in the liquid. For example, the above article entitled "Effect of Noble Gas Doping in Single-Bubble Sonoluminescence" by Hiller et al., who have looked in achieving sonoluminescence in nonaqueous fluids such as alcohol and silicon oil, states the following:

In nonaqueous fluids, we have been able to trap (nonlight emitting) air bubbles with sound, but at high drive levels, these systems have resisted our attempts to observe the transition to SL [sonoluminescence-ed.]. We propose that this difficulty is related to the unusually low solubility of gases in water (6), or equivalently to the fact that air is far more soluble in nonaqueous fluids such as alcohol and silicon oil.

Similarly, in another reference, namely the above-identified Ph.D. Dissertation entitled "Synchronous Picosecond Sonoluminescence", B. P. Barber notes that in order to obtain sonoluminescence in water it was first necessary to completely de-gas the water.

Some authors have also recognized that single-bubble sonoluminescence might be applicable to inertial confinement fusion. For example, in the above-referenced article entitled "Sensitivity of Sonoluminescence to Experimental Parameters", the authors write:

Assuming that these estimates would apply for a gas bubble which contains a mixture of deuterium and tritium, and that they remain physically valid at such minute length and time scales, the repetitive SL implosions generate about 1 n/s in such a mixture. Changes in the equation of state that these temperatures would bring about have also been ignored in making these estimates.

The neutron emission, N. was obtained from the standard formula [15] .... This computation yields about 40 n/s, but the results are very sensitive to the launch conditions, in part because a depends strongly on the conditions in a Van der Waals gas [16]."

This article calculates the fusion rate on the basis of an equilibrium temperature. As can be seen from the above quotation, this calculation yields a value for the neutron flux many orders of magnitude below any useful value for the generation of heat.

SUMMARY OF THE INVENTION

In general, in one aspect, the invention is an apparatus for concentrating acoustic energy to produce large velocity, high pressure and/or high temperature conditions. The apparatus includes a container forming a resonant cavity; a low compressibility liquid filling the resonant cavity; one or more transducers which couple energy into the resonant cavity when driven by an excitation signal; and a power source connected to the transducers. The low compressibility liquid has a compressibility that is smaller than that of water at room temperature (e.g. less than about $4.548 \times 10^{-10}$ $(\text{meters})^2 \times (\text{newtons})^{-1}$.). The power source generates the excitation signal which causes the transducers to drive the resonant cavity at or near a resonant mode.

In general, in another aspect, the invention is a method of concentrating acoustic energy to produce large velocity, high pressure and/or high temperature conditions. The method includes the steps of: forming a resonant cavity inside a container; filling the resonant cavity with a liquid having a compressibility that is smaller than that of water at room temperature; coupling energy into the resonant cavity so as to drive it into a resonant mode characterized by one or more velocity nodes in the liquid; and capturing a quantity of material or mixture of material in the resonant cavity at one of the velocity nodes.

Preferred embodiments include the following features. The low compressibility liquid has a compressibility that is less than about $4.414\times10^{-10}$ (meters)$^2\times$(newtons)$^{-1}$. For example, the liquid comprises a liquid metal or a liquid metal alloy. The container is made of metal and the resonance is at a fundamental mode of the filled resonant cavity. The apparatus also includes means for placing the liquid in the container under isostatic pressure and it includes a temperature controlled enclosure surrounding the container. The material or mixture of material that is injected into the cavity includes a mixture of a hydrocarbon (e.g. acetylene) and oxygen.

Also in preferred embodiments, the container has an opening to which a conduit is connected. The conduit is for injecting through the opening a material or mixture of material that is released into the cavity so that it approaches and is captured at the velocity node. The invention also includes an injecting device connected to the conduit for injecting a preselected material or mixture of material into the resonant container in a precisely known amount and composition.

The use of liquid metal, liquid metal alloys or liquids of small compressibility in the container will produce in materials and/or mixtures of materials which are placed at a velocity node in the container velocities, pressures, and temperatures that are higher than those achievable using other prior art techniques. Given the appropriate selection of materials at the velocity node, the higher velocities, pressures, and temperatures, can be used to create light, heat and/or other byproducts.

Indeed, the present invention will generate in materials trapped at the velocity node velocities, pressures, and temperatures similar to those being currently considered for inertial confinement fusion. Under the temperatures and pressures that are achievable in the materials at the velocity node, the net movement of material or materials from the surface of the bubble of material toward its center might cause the onset of fusion.

The technique for introducing gas into the resonant container simultaneously satisfies two important requirements, i.e., controlling the exact amount of gas introduced into the resonant container and controlling the precise composition of the gas introduced into the resonant container.

Other advantages and features will become apparent from the following description of the preferred embodiments and from the claims.

DESCRIPTION OF THE PREFERRED EMBODIMENTS

Figure 1:
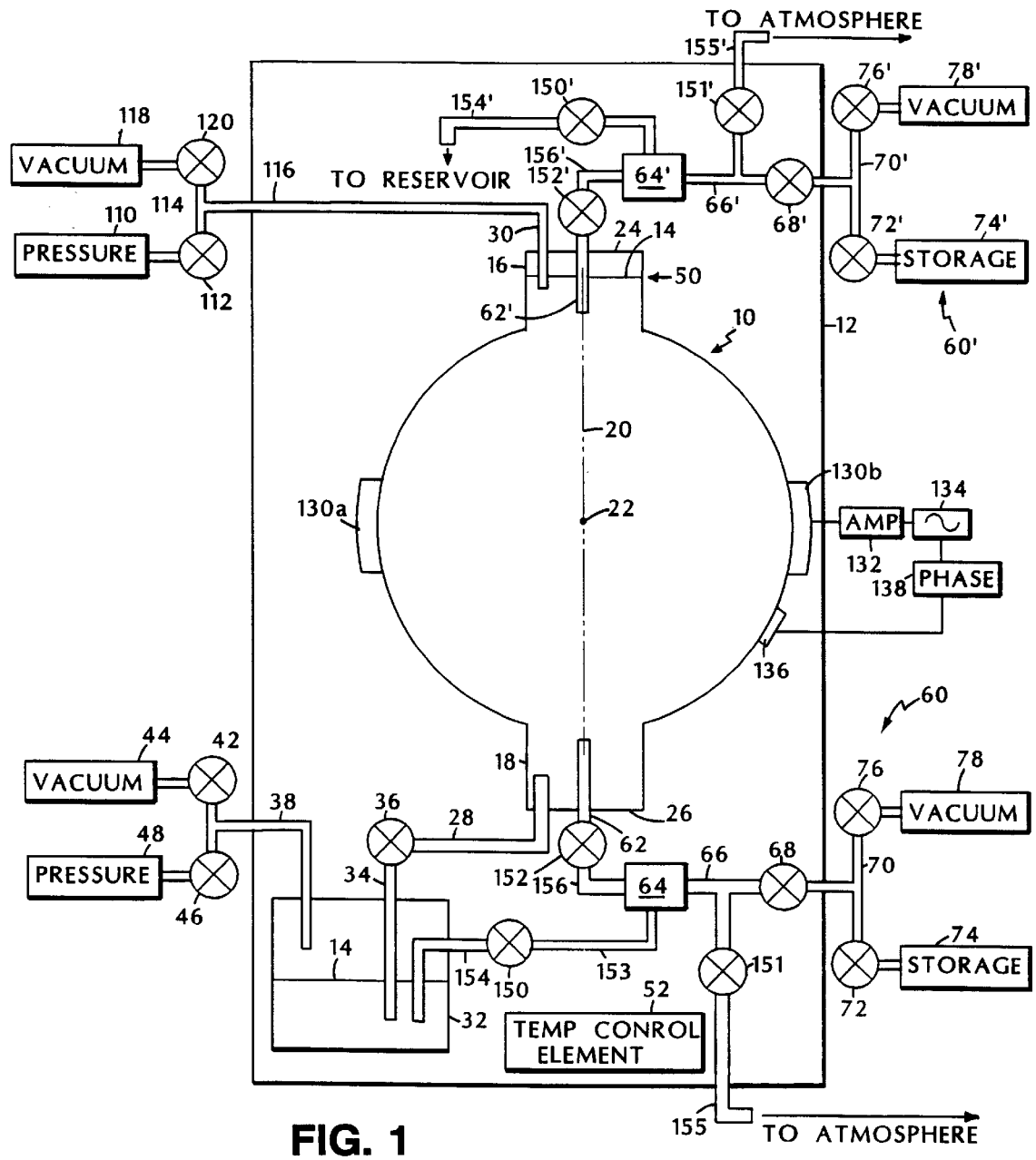
FIG. 1 is a block diagram of an apparatus embodying the invention.

Referring to FIG. 1, the system includes a spherical container 10 inside an insulated enclosure 12. Container 10, which defines a resonant cavity, is filled with a liquid 14 that has a small compressibility relative to that of water. In the described embodiment, which is merely illustrative, container 10 is made of pyrex. It should be understood, however, that container 10 can be made of any of a wide variety of materials (e.g. quartz, a metal such as stainless steel, bronze, or any other appropriate material). In addition, container 10 can have any shape that is easy to manufacture (e.g. cylindrical). Similarly, liquid 14 may be any material (e.g. chemical solution, nonaqueous solution, metal, or metal alloy) that is liquid at the operating temperature of the system and which has a compressibility at that temperature which is less than the compressibility of pure water at room temperature (i.e., 23° C.), and preferably, less than the minimum compressibility of water which occurs at about 46° C. At room temperature (i.e., 23° C.), water has a compressibility of about $4.548\times10^{-10}$ (meters)$^2\times$(newtons)$^{-1}$; and at 46° C. it a compressibility of about $4.414\times10^{-10}$ (meters)$^2\times$(newtons)$^{31\ 1}$.

In the described embodiment, the liquid was a water solution of NaCl or CuSO$_4$. It was prepared by first adding the salt to pure water in sufficient quantities to form a supersaturated solution and then diluting that solution with pure water. It was slightly diluted in this way to reduce the possibility that crystals would come of solution in the container due to possible evaporation. The addition of NaCl or CuSO$_4$ lowers the compressibility of water to below that which is obtainable from pure water.

Alternatively, one could obtain an order of magnitude or more reduction of compressibility over that of a salt solution by using liquid metals or liquid metal alloys. For example, the liquid could be mercury or a mixture of bismuth (48.0%), lead (25.6%), tin (12.8%), cadmium (9.6%), and indium (4.0%). Mercury melts at −38.87° C. while the above eutectic alloy melts at about 64° C. On the other hand, a mixture of bismuth (58.0%) and tin (42.0%) melts at about 138° C. Pure lead melts at about 327.3° C. Hence, a very wide temperature range is available in metals or metal alloys.

Cylindrical tubes 16 and 18 extend out of the top and bottom, respectively, of container 10. The axes of tubes 16 and 18 are collinear with each other and they define a central axis 20 of the system which is parallel with the gravitational force and passes through a center 22 of the spherical container. The ends of tubes 16 and 18 are sealed by plates 24 and 26, respectively. A pipe 28, through which liquid can be flowed into the container, passes through plate 26 at the bottom. Another pipe 30, through which the inside of the container can be pressurized, passes through plate 24 at the top.

The system for supplying liquid to and extracting liquid from container 10 includes a sealed reservoir 32 located inside of insulated enclosure 12 and is filled with liquid 14, an outlet pipe 34 passing into reservoir 32, and a shut off valve 36 connecting pipe 34 to pipe 28. Another pipe 38 into reservoir 32 penetrates the wall of the enclosure to the outside where it connects through a first shutoff valve 42 to a vacuum pump 44 (or some source of vacuum) and through a second shutoff valve 46 to a supply 48 of pressurized gas. To fill container 10, valve 36 is opened so that liquid can flow into container 10 and then valve 46 is opened to pressurize the reservoir, thereby forcing the liquid into the container. When container 10 has completely filled and liquid has risen up inside tube 16 to a level indicated by in FIG. 1, both valves 46 and 36 are closed. To return liquid to reservoir 32, valve 36 is opened and then valve 42 is opened so that a vacuum is created in reservoir 32 thereby pulling liquid back into reservoir from container 10.

In the described embodiment, reservoir 32 contains a larger volume of liquid than container 10 is capable of holding. Thus, after completely filling container 10, at least some liquid remains in reservoir 32.

Container 10 and reservoir 32 are both contained inside an insulated enclosure 12 which includes a temperature control element 52 (e.g. either a heating or a cooling element) that is used to maintain a constant temperature in enclosure 12. If a liquid metal is used which has a melting point that is above room temperature, the temperature in enclosure 12 is maintained above that melting point of the liquid metal.

FIG. 1 also shows two material delivery systems 60 and 60' for introducing precise quantities of a materials or mixture of materials of known composition into container 10. Delivery system 60, which connects to the bottom of the container, introduces a material or a mixture of material that has a lower density than that of the liquid, i.e., buoyant materials which float upwards when introduced into the liquid. Delivery system 60', which connects to the top of the container, introduces a material or a mixture of materials that has a higher density than that of the liquid, i.e., materials which sinks downward when introduced into the liquid.

Delivery system 60 includes a capillary tube 62 which passes through plate 26 and into container 10. The other end of capillary tube 62 is connected through a valve 152 of metering device 64 to an outlet line 156 of a metering device 64. One input line 153 is connected through a shutoff valve 150 to a line 154 which passes into the liquid in reservoir 32. Another input line 66 of metering device 64 connects to two valves 68 and 151. Valve 68 controls the introduction of a material or mixture of materials of known composition into the metering valve and, as will be described in greater detail below, valve 151 allows liquid that has been introduced into line 66 to be ejected from line 66. The other side of valve 68 connects to one branch of a tee connector 70 on the outside of enclosure 12. A second branch of the tee connector is connected through a valve 72 to a storage cylinder 74, in which a material or mixture of materials that is to be introduced into container 10 is kept under pressure. A third branch of the tee connector is connected through a valve 76 to a vacuum pump 78. The vacuum pump is used to clear out the lines connecting storage cylinder 74 to metering device 64 prior to opening valve 72 to introduce the stored material or mixture of materials into container 10.

Delivery system 60' is designed similarly to delivery system 60. The components of delivery system 60' that correspond to like components in delivery system 60 are numbered by the same number with a prime (e.g. metering device 64' corresponds to metering device 64).

Figure 2:
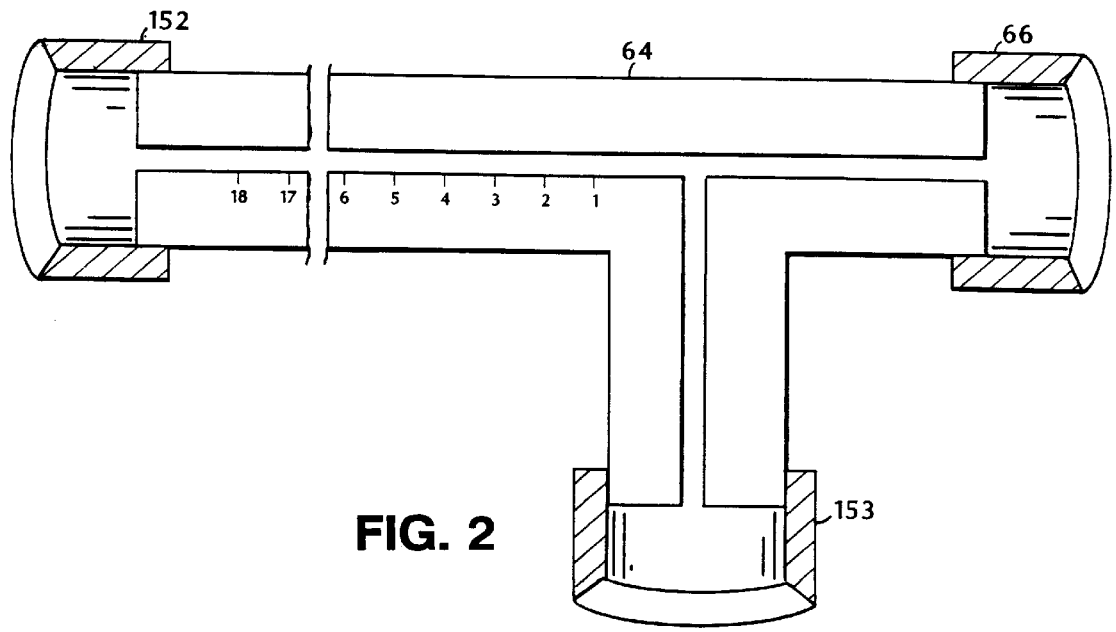
FIG. 2 is a capillary tee which is used as a metering device.

In the described embodiment, metering device 64 is a capillary tee, as shown in FIG. 2, which is made of a transparent material (e.g. glass) and which has an inside diameter of 0.4 mm and an outside diameter of about 3 mm. As indicated, the length of the arm of the tee that is connected to tube 156 is about 18 mm long and is graduated. The capillary tee enables one to accurately inject into cavity 10 bubbles of a selectable, known size ranging from about 0.4 mm to about 1.2 mm in diameter. Choosing a capillary tee having an inside diameter of 0.2 mm will enable one to inject bubbles of a selectable size ranging from about 0.25 mm to about 0.8 mm in diameter. The upper size limit of the bubbles can easily be increased by increasing the length of the tee.

Note that in the described embodiment, both capillary tubes 62 and 62' are aligned with central axis 20 so that any materials that are introduced into the cavity through these tubes will rise or fall through the geometrical center 22 of the spherical container. As will become apparent later, the center of the sphere is important because that is where a velocity node will appear when the cavity is acoustically driven at its fundamental resonant frequency.

A supply of pressurized gas 110 is connected through a valve 112 and a tee connector 114 to a line 116 that passes through plate 24 at the top of container 10. A vacuum pump 118 is connected through a second valve 120 to the other branch of the tee connector. The supply of pressurized gas is used to assist in emptying the container of liquid or to place the liquid in container 10 under hydrostatic pressure. Vacuum pump 118 is used to evacuate container 10 and thereby assist in filling the container from reservoir 32.

Two sonic transducers 130$a$ and 130$b$ are acoustically coupled to the outside wall of container 10. (Note that good results can also be obtained by using 3, 4 or more transducers.) They are located midway between the top and the bottom of the container and on opposites sides from each other. In the described embodiment, the sonic transducers are piezoelectric devices which convert electrical energy to acoustical energy. It should be understood, however, that any convenient way of coupling acoustic energy into the liquid in the cavity to drive the system into an acoustical resonance mode can be employed.

Steps were taken to produce a good acoustic coupling between the transducers and the wall of the container. In the described embodiment, the transducers were flat circular disks. So when they were placed against the outside wall of the container, they contacted the wall only over a small area at the point of tangency between the disk and the spherical wall. To increase the acoustical contact, a ring having an outside diameter that was approximately equal to the diameter of the transducer was placed between the transducer and the wall. The height of the ring was such that the transducer contacted the wall at the point of tangency. The inside of the ring between the transducer and the container wall was filled with an epoxy. In this way, the area of acoustical contact with the container wall was approximately equal to the area of the transducer.

Transducers 130$a$ and 130$b$ are driven by a voltage controlled oscillator 134 in combination with an amplifier 132. A phase-locked loop may be used to keep the system operating at the resonance frequency. In the phase-locked loop, a microphone 136, which is acoustically coupled to the wall of the container 10, generates a feedback signal for a phase detector 138.

Oscillator 134 drives amplifier 132, which in turn drives transducers 130$a$ and 130$b$. The frequency of oscillator 134 can be controlled manually by keeping the output of the microphone at a maximum or by keeping the current and voltage of amplifier 132 in phase. This keeps the liquid filled cavity at or near resonance. Alternatively, one can keep the amplifier-oscillator system at or near the resonant frequency of the liquid filled cavity by phase-locking microphone 136 to oscillator 134 (which is voltage controlled). Another method to achieve the same result is to amplify the microphone signal and send it to amplifier 132 with the proper phase to maintain the oscillation. Either technique adjusts the frequency of the oscillator so as to keep the system locked at or near the resonance in spite of any changes that might occur in the mechanical properties of the system due to changes in temperature, changes in liquid density, or changes in any other system parameters that influence the resonant frequency of the system. In general, circuitry and techniques for accomplishing this are well known, see, for example, "Effect of Noble Gas Doping in Single-Bubble Sonoluminescence" by R. Hiller, K. Weninger, S. J. Putterman, and B. P. Barber; Science, Volume 266, Oct. 14, 1994, pages 248–250 and references 9 and 10 cited therein.

As pointed out in the above article by Hiller et al., attempting to lock onto a frequency that is near to resonant frequency, as opposed to being precisely at the resonant frequency, may be preferable since it may tend to produce more stable control. That is, the system will be less likely to jump back and forth between frequencies that are on either side of the resonance peak.

Figure 3:
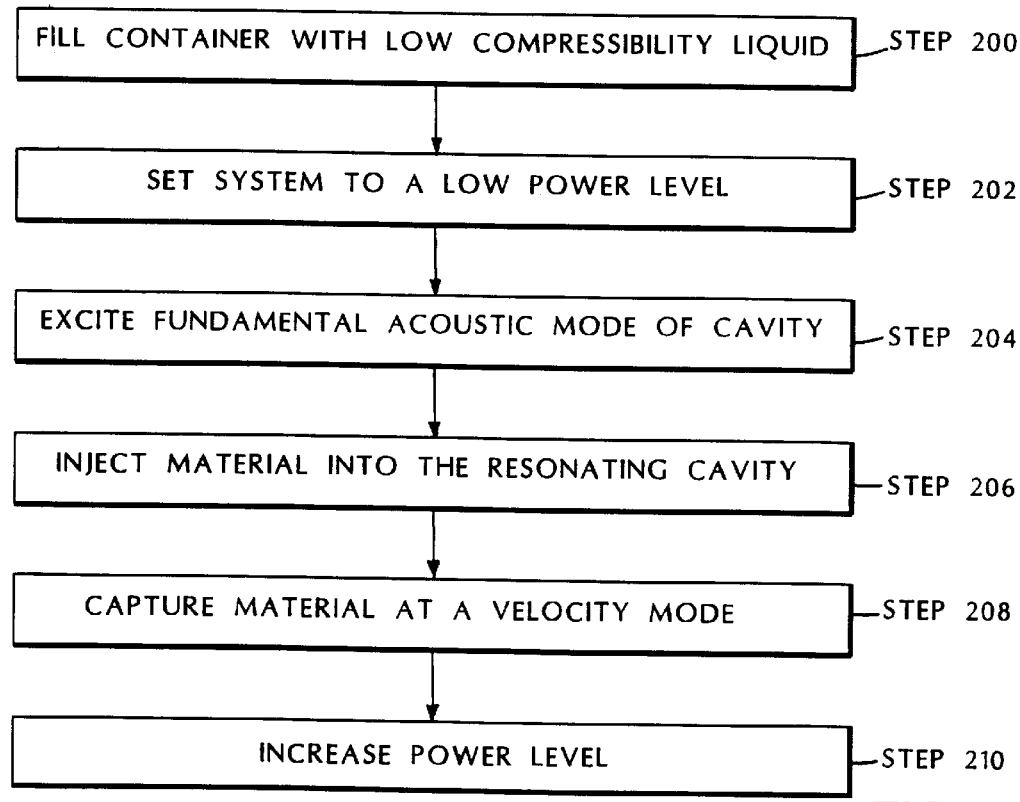
FIG. 3 is a flow chart showing the operation of the invention.

Referring to FIG. 3, the following is a general description of the operation of the system. First, the container is filled with a low compressibility liquid from the reservoir (step 200). Then, amplifier 132 is set to a low power level (e.g. 3–5 Watts to the transducers) (step 202) and the frequency of the oscillator is tuned to the frequency that excites the fundamental acoustic mode of the filled cavity (step 204). For a spherical cavity having a diameter of about 6 cm, the fundamental mode will be outside the audio range (e.g. 25 kHz) and it is therefore necessary to view the signal output of microphone 136 using an oscilloscope (not shown). Hence, it will be easy to detect when the resonant frequency is located (i.e., the ultrasonic sound emitted by the cavity will increase significantly at that frequency). When the cavity is being driven at its fundamental frequency, a velocity node will exist at the center of the cavity.

After the fundamental frequency has been located and locked onto, a known amount of a selected material or mixture of materials is introduced into the system through an appropriate one of the capillary tubes 62 or 62' (step 206). As the material or mixture of materials passes near the velocity node at the center of the cavity, it will be swept into and captured by that node (step 208). After the material or mixture of materials has been captured at a velocity node, the power to the system is increased to a higher level (e.g. 10–20 Watts or higher) (step 210). The increased acoustical energy will produce high temperatures, pressures, and velocities in the materials captured at the velocity node.

Using either material delivery system 60 or 60', a known amount of material or mixture of materials is injected into cavity 10 according to the following procedure. It is assumed that the valves within the material delivery system are initially all in a closed position. After the cavity has been placed into resonance, valve 68 and then valve 76 are opened so as to evacuate tee connector 70, line 66, metering device 64 and lines 153 and 156. After the lines are evacuated, valves 76 and 68 are closed. Then, valve 150 is opened to allow liquid from reservoir 32 to flow into the evacuated lines. After the lines have been filled with liquid from the reservoir, valve 150 is closed and valve 72 is opened to prepare for the introduction of material(s) from storage cylinder 74. Valves 68 and 152 are then opened to permit a controlled amount of the material(s) to be delivered to the metering device 64. Liquid is forced out of metering device 64 until the liquid-gas interface (assuming the stored material is a gas) reaches the desired line on the graduated arm of the capillary tee. When the desired amount of material(s) has flowed into the capillary tee, valves 68 and 152 are closed. Then valve 151 is opened. With valve 151 open, valve 150 is opened until liquid moves into the ungraduated arm of the capillary tee (i.e., the side connected to line 66) at which point valve 150 is closed. Then valve 151 is closed and valve 152 is opened so that the known amount of material(s) in the capillary tee can be injected into the cavity. The material or mixture of material is forced into the cavity by again opening valve 150 so that liquid from the reservoir pushes the quantity of material(s) in the metering device through line 156, valve 150, and capillary tube 62 into the cavity. Then, valve 152 is closed.

It has been observed that it becomes more difficult to capture materials at a velocity node as the power level is increased. Thus, it is preferable to begin with a low power level delay and then increase the power to higher levels after the material has been captured at velocity node. Also note that the amount of power that is coupled into the cavity from the transducers will depend upon the efficiency of the acoustic coupling to the container, as well as on other system parameters, such as the Q of the cavity. Thus, for different systems, the power levels may differ from the ones disclosed here.

Note that a primary requirement of the each materials delivery systems 60 and 60' is that it introduce the material or mixture of material into the cavity so that the material or mixture of material moves away from the wall of the container after it is introduced. Once the material or mixture of material is sufficiently far away from the wall, the acoustic pressure differential between the outer perimeter of the cavity and the center will push it towards the velocity node at the center of the cavity. In the case of a cavity having a diameter of about 6 cm, a sufficient distance from the wall is on the order of millimeters (e.g. >1 mm). In the case of a cavity having a diameter of about 1 meter, a sufficient distance is on the order of centimeters (e.g. >1 cm).

From the above, it should also be clear that the precise location of capillary tubes 62 and 62' relative to the velocity node is not critical. Though the capillary tubes were shown to be directly above and directly below the velocity node, they need not be. As long as they are located so that when the material is introduced through them into the cavity, the material will move away from the container wall, that is sufficient. Thus, for example, in the case of the spherical cavity if the outlet orifice of the capillary tube 60 is located in the lower half of the sphere, that would be satisfactory.

A basic principle behind the operation of the present invention is as follows. When the surface of the liquid in the container is driven towards the interior of the liquid, then a point or points within the liquid will become a velocity node(s). If the liquid is incompressible, the pressure at this velocity node will become infinite. However, since no liquid is incompressible, the actual achievable pressure is determined by the inward velocity of the surface of the liquid contained in the container and the compressibility of the liquid. Hence, the smaller the compressibility, the higher the pressure.

As a specific example, assume you have a sphere of liquid of zero compressibility with radius $R_o$ and you place a bubble of gas at the center of the sphere of radius $r_o$, where $R_o >> r_o$. Assume you drive the outer surface of the liquid such that the surface coherently vibrates radially. This can be done by exciting the large sphere of liquid plus the small sphere of gas into its lowest radial mode. In this case, the center of the sphere is a velocity node. If the liquid has zero compressibility and the gas at the center has relatively large compressibility, the vibrations at the surface of the large sphere of liquid will be amplified at the surface of the little gas sphere. In particular, the velocity of the surface of the small gas sphere will be $(R_o/r_o)^2$ times the velocity of the surface of the large sphere. If values of the radius of the large sphere are between centimeters and meters and the size of the small gas sphere is between microns and millimeters, then velocity gains between $10^6$ to $10^8$ will be achievable.

In the described embodiment, a typical operational velocity at the surface of the large liquid sphere will be on the order of meters per second which implies velocities at the surface of the small gas sphere of the order of $10^6$ to $10^8$ meters per second. These are velocities greatly in excess of Mach one in all materials.

Indeed, these high velocities have very important consequences for the production of a fusion reaction. In order to fuse two atoms (e.g. two deuterium atoms) together, the repulsive coulomb barrier must be overcome. If two deuterium atoms make a head-on collision, each with velocity of the order of $10^6$ meters per second, they will overcome the coulomb barrier. In the absence of turbulence, all the deuterium atoms would meet at the center of the bubble of deuterium with enough velocity to overcome the coulomb barrier and create a large amount of fusion energy. However, there will be turbulence so not all the deuterium atoms would meet in the center of the sphere with the necessary velocity to overcome the coulomb barrier. Even so, enough deuterium atoms will collide with sufficient velocity to create a substantial amount of fusion energy.

In reality, the liquid in the large sphere will not have zero compressibility. Nevertheless, the smaller the compressibility of the liquid in the large sphere, the larger will be the velocity at the interface between the liquid in the large sphere and the gas in the small sphere. And the larger the velocity at the interface, the larger the pressure that the liquid will exert on the surface of the gas in the small sphere. Hence, if the liquid of the large sphere has a small compressibility, large velocities and a very strong shock wave will be generated in the small gas sphere. These large velocities and the strong shock wave will produce high pressure and high temperature in the gas of the small sphere. Moreover, the smaller the compressibility of the liquid in the large sphere, the higher the velocity, pressure, and temperature will be.

The above description is valid independent of the shape of the container holding the liquid and it does not depend on the material in the smaller volume being a gas.

An important point is that using a liquid of small compressibility in the manner described herein will generate large velocities, high pressures and high temperatures in materials and/or mixtures of materials at a velocity node at the interior of the liquid of small compressibility. The velocities, pressures, and temperatures will be higher than what has thus far been achievable in the prior art. Moreover, the conditions produced at the velocity node can be used to aid in the combustion of materials, to create other substances, and even to ignite a nuclear fuel.

Many existing combustion-based processes could benefit from the higher temperatures, pressures, and velocities that are attainable from the above-described system. For example, a process which could be performed more effectively using the invention is the combustion of acetylene with oxygen to produce heat and various forms of carbon. Performing the combustion under the higher temperatures and pressures that are achievable at a velocity node will yield more complete conversion of the acetylene and significantly reduce the generation of $CO_2$, as compared to conventional combustion techniques. In fact, the combustion of any hydrocarbon at a velocity node will yield more complete conversion of the hydrocarbon to heat, water, and various forms of carbon with a reduced emission of $CO_2$ as compared to conventional combustion techniques.

By picking the proper liquid material (e.g. metal or metal alloy), the operating temperature of the invention can be matched to the application of the invention. For example, if the purpose of the invention is to produce steam at 150 degrees centigrade, it is quite easy to find a eutectic alloy that has a melting point of 160 degrees. This has the advantage that the container could operate at one atmosphere, and the temperature of the liquid alloy would be as far as possible from the boiling point of the metal alloy. In addition the liquid metal alloy would be at a low compressibility. Therefore, the fact that this invention allows the temperature of the liquid metal, metal alloy, or other liquid of small compressibility to be chosen so that the melting point of the liquid matches the operating point of the invention, has three important advantages: (1) the liquid can operate at one atmosphere or lower if desired; (2) the liquid can operate as far as possible below its boiling point; and (3) the liquid can operate at a low compressibility (e.g. near the liquid's lowest compressibility which typically occurs just above the liquid's melting point).

In accordance with another aspect of the invention, the liquid in the container can be placed under isostatic pressure. This will further enhance the increase in pressure that is obtainable in the material or mixture of material at the velocity node. It is well known that thermal nuclear reactions proceed as the square of the number density of atoms at the reaction site. For example, a mixture of deuterium and tritium at 10 atmospheres will have 100 times the reaction rate as a mixture at one atmosphere. Hence, being able to place a hydrostatic pressure on the liquid in the container will increase reaction rates in processes such as thermal fusion.

As indicated earlier, other geometries besides spherical may be used for the container. However, an advantage of using a geometry that has radial symmetry, such as a sphere or a cylinder, is that the location of the velocity node(s) can be easily calculated. With more complex geometries, the calculations that are necessary to compute the location of the velocity node(s) become much more complex. Indeed, they become so complex that it may be more practical to find the locations of the velocity node(s) empirically.

It is also possible to use resonant frequencies that are higher than the fundamental mode. At higher resonant frequencies, multiple velocity nodes will appear, each one being a point at which material can be captured.

Other embodiments of the invention are within the following claims.

What is claimed is:

1. A method of concentrating acoustic energy to produce large velocity, high pressure and/or high temperature conditions, said method comprising:

forming a resonant cavity inside a container;

filling the resonant cavity with a low compressibility liquid, said low compressibility liquid having a compressibility that is smaller than that of water at room temperature;

coupling energy into the resonant cavity at a frequency which drives said resonant cavity at or near a resonant mode, wherein said resonant mode is characterized by one or more velocity nodes in said resonant cavity; and capturing a quantity of material or a mixture of material in the resonant cavity at one of said one or more velocity nodes.

2. The method of claim 1 further comprising increasing power delivered to the resonant cavity after capturing the material or mixture of material at one of said one or more velocity nodes.

3. The method of claim 1 further comprising using for the low compressibility liquid a liquid having a compressibility that is less than about $4.548 \times 10^{-10}$ (meters)$^2 \times$(newtons)$^{-1}$.

4. The method of claim 3 further comprising using for the low compressibility liquid a liquid having a compressibility that is less than about $4.414 \times 10^{-10}$ (meters)$^2 \times$(newtons)$^{-1}$.

5. The method of claim 4 further comprising injecting said quantity of material or mixture of material into the resonant cavity above one of said one or more velocity nodes so that it approaches and is captured at said one of said one or more velocity nodes.

6. The method of claim 5 further comprising controlling the amount and composition of the material or mixture of material that is injected into said cavity so that a known amount and composition of material or mixture of material is injected during the injecting step.

7. The method of claim 4 further comprising introducing said quantity of material or mixture of material into the resonant cavity through the bottom of the cavity below one of said one or more velocity nodes so that it approaches and is captured at said one of said one or more velocity nodes.

8. The method of claim 7 further comprising controlling the amount and composition of the material or mixture of material that is injected into said cavity so that a known amount and composition of material or mixture of material is injected during the injecting step.

9. The method of claim 4 further comprising after capturing said quantity of material or mixture of material at said velocity node, increasing the rate at which power is delivered to the cavity while maintaining said cavity in resonance.

10. The method of claim 4 further comprising locking said frequency onto the resonance of said cavity.

11. The method of claim 4 further comprising heating said cavity and the liquid contained therein to an operating temperature that is greater than room temperature.

12. The method of claim 11 further comprising selecting the operating temperature to be near the melting point of the liquid.

13. The method of claim 11 further comprising selecting the operating temperature to be near a temperature at which the liquid has a minimum compressibility.

14. The method of claim 4 further comprising cooling said cavity and the liquid contained therein to a temperature that is below room temperature.

15. The method of claim 4 further comprising applying isostatic pressure to said liquid in the cavity while the cavity is driven at its resonance.

16. The method of claim 1 further comprising using a liquid metal as the low compressibility liquid.

17. The method of claim 16 further comprising using a liquid metal alloy as the low compressibility liquid.

18. The method of claim 17 wherein the liquid metal alloy includes mercury.

19. The method of claim 16 wherein the liquid metal is mercury.

20. The method of claim 1 wherein said material or mixture of material comprises a hydrocarbon.

21. The method of claim 20 wherein said material or mixture of material comprises a mixture of said hydrocarbon and oxygen.

22. The method of claim 21 wherein said hydrocarbon comprises acetylene.

23. The method of claim 1 wherein the step of coupling energy into the resonant cavity comprises coupling acoustic energy into the resonant cavity, said acoustic energy having a frequency at or near said resonant mode.

* * * * *